United States Patent
Zhou et al.

(10) Patent No.: US 10,795,171 B2
(45) Date of Patent: Oct. 6, 2020

(54) OPTICAL-FIBER ATOMIC LIGHT-FILTERING APPARATUS

(71) Applicant: Wuhan Institute of Physics And Mathematics, Chinese Academy of Sciences, Wuhan, Hubei (CN)

(72) Inventors: Xin Zhou, Hubei (CN); Xianping Sun, Hubei (CN); Xiuchao Zhao, Hubei (CN); Maili Liu, Hubei (CN); Chaohui Ye, Hubei (CN)

(73) Assignee: Wuhan Institute of Physics And Mathematics Chinese Academy of Sciences, Wuhan, Hubei (CN)

( * ) Notice: Subject to any disclaimer, the term of this patent is extended or adjusted under 35 U.S.C. 154(b) by 132 days.

(21) Appl. No.: 16/219,769

(22) Filed: Dec. 13, 2018

(65) Prior Publication Data

US 2019/0121152 A1 Apr. 25, 2019

Related U.S. Application Data

(63) Continuation of application No. PCT/CN2016/094644, filed on Aug. 11, 2016.

(30) Foreign Application Priority Data

Jul. 27, 2016 (CN) .......................... 2016 1 0602759

(51) Int. Cl.
*G02B 27/28* (2006.01)
*G02F 1/09* (2006.01)
(Continued)

(52) U.S. Cl.
CPC .......... *G02B 27/288* (2013.01); *G02B 27/28* (2013.01); *G02B 27/281* (2013.01); *G02B 27/30* (2013.01);
(Continued)

(58) Field of Classification Search
CPC .......... G02B 27/288; G02B 27/30; G02F 1/09; H04B 10/70
(Continued)

(56) References Cited

U.S. PATENT DOCUMENTS 5,192,978 A 3/1993 Keeler
5,731,585 A * 3/1998 Menders .............. H04B 10/118
250/382

(Continued)

FOREIGN PATENT DOCUMENTS

CN 1545228 A 11/2004
CN 101241241 A 8/2008
(Continued)

OTHER PUBLICATIONS

Petr Siyushev et al., "Molecular photons interfaced with alkali atoms," Nature, 509, pp. 66-73 (2014).
(Continued)

*Primary Examiner* — Ricky D Shafer
(74) *Attorney, Agent, or Firm* — Mei & Mark LLP; Manni Li

(57) ABSTRACT

An optical-fiber atomic light-filtering apparatus comprising an optical-fiber coupling focusing collimating mirror, a first polarizing optical fiber, a first permanent magnetic ring, a pure iron frame shaped like the Chinese character "日", a heat preservation box, a first capillary atomic cell, an armored twisted-pair heating wire, a second permanent magnetic ring, a second polarizing optical fiber, a thermostat, a cable, a third permanent magnetic ring, a temperature sensor, a second capillary atomic cell, a fourth permanent magnetic ring, a third polarizing optical fiber and a photoelectric detector. The two pairs of permanent magnetic rings are matched with the pure iron frame shaped like the Chinese character "日" to provide magnetic fields for the (Continued)

two capillary atomic cells working in the same temperature environment; a polarizing plane changes after interaction between a weak signal light and atoms.

2 Claims, 2 Drawing Sheets

(51) Int. Cl.
  *G02F 3/00* (2006.01)
  *G02B 27/30* (2006.01)
  *H04B 10/70* (2013.01)
(52) U.S. Cl.
  CPC .................. *G02F 1/09* (2013.01); *G02F 3/00* (2013.01); *H04B 10/70* (2013.01)
(58) Field of Classification Search
  USPC ............... 359/280, 282, 484.02, 489.01, 641
  See application file for complete search history.

(56) References Cited

U.S. PATENT DOCUMENTS

| | | | |
|---|---|---|---|
| 8,031,873 B2* | 10/2011 | Sun | H04L 9/0858 380/255 |
| 2004/0264958 A1* | 12/2004 | Zoller | H04B 10/70 398/40 |
| 2005/0078729 A1* | 4/2005 | Zhao | H01S 3/10 372/56 |
| 2006/0056029 A1 | 3/2006 | Ye | |

FOREIGN PATENT DOCUMENTS

| | | |
|---|---|---|
| CN | 101788691 A | 7/2010 |
| CN | 101794033 A | 8/2010 |
| CN | 102147538 A | 8/2011 |
| CN | 102902075 A | 1/2013 |
| CN | 204517141 U | 7/2015 |

OTHER PUBLICATIONS

Wilhelm Kiefer et al., "Na-Faraday rotation filtering: The optimal point," Scientific Reports, 4, pp. 1-7 (2014).
Zhilin Hu et al., " Temperature properties of Na dispersive Faraday optical filter at $D_1$ and $D_2$ line," Opt. Commun., 156, pp. 289-293 (1998).
Xin Shan et al., "Free-space quantum key distribution with Rb vapor filters," Applied Physics Letter, 89(19), 191121-1 to 191121-3 (2006).
Xiuchao Zhao et al., "Atomic filter based on stimulated Raman transition at the rubidium D1 line," Optics Express, vol. 23, No. 14, pp. 17988-17994 (2015).
Xin Shan et al., "Ultranarrow-bandwidth atomic filter with Raman light amplification," Opt. Lett., vol. 33, No. 16, pp. 1842-1844 (2008).
Zheng Tan et al., "Narrowband switchable dual-passband atomic f ilter with four-wave mixing optical amplification," Chin. Opt. Lett., vol. 9, No. 2, pp. 021405-1 to 021405-4 (2011).

* cited by examiner

OPTICAL-FIBER ATOMIC LIGHT-FILTERING APPARATUS

CROSS-REFERENCE TO RELATED APPLICATIONS

The subject application is a continuation of PCT/CN2016/094644 filed Aug. 11, 2016, which claims priority on Chinese application no. CN201610602759.6 filed on Jul. 27, 2016. The contents and subject matters of both PCT application and Chinese priority application are incorporated herein by reference.

BACKGROUND OF THE INVENTION

Technical Field

The present invention relates to the fields of quantum information processing, laser communication, laser radar, and telemetering of remote light signals in free spaces, in particular to an optical-fiber atomic light-filtering apparatus, which has an ultra-narrow passband, can filter out backlight (such as sunlight and lamplight) noise based on the interaction of atoms in magnetic fields and signal light through the optical fiber polarizing technique, and is applicable to the extraction and measurement of a weak signal light in a free space.

Description of Related Art

As for systems for quantum information processing [Nature, 509, 66(2014)], laser communication and atmospheric potassium or sodium fluorescent detection laser radar [Scientific Reports, 4, 1(2014)] in free spaces, atoms are generally used as media interacting with a signal light to filter out strong backlight noise (such as sunlight and lamplight), so that the weak signal light can be transmitted at a high pass and be effectively observed. Generally, the traditional atomic Faraday anomalous dispersion optical filtering is composed of atomic vapor bubbles and Glan-Thompson prisms located on two sides of the atomic vapor bubbles and having perpendicular polarizing directions [Opt. Commun., 156, 289(1998)] and provided with an ultra-narrow filter channel formed based on atomic spectral line characteristics, has a filter line width (~GHz level or narrower) which is narrower than that of interference filters (~nm-level bandwidth) or that of Fabry-Perot cavities, and also has the characteristics of continuously tunable filter frequency within a certain range. As for the example of quantum communication, the transmission characteristic and out-of-band rejection ratio of the Faraday anomalous dispersion optical filtering usually have an influence on the fidelity [U.S. Pat. No. 8,031,873], although the Faraday anomalous dispersion optical filtering can work in most environments, there are still backlight photons failing to be restrained under certain special conditions such as direct sunlight reception telescopes, and consequentially, a high error rate which will affect effective quantum communication is generated [Applied Physics Letter, 89(19), 191121 (2006)].

Thus, certain novel atomic filter methods and devices such as Raman light amplification [Optics Express, 23 14 (2015), 17988; Opt. Lett. 33(16), 1842-1844 (2008); Chinese Invention Patent No. ZL 200810046862.2] and quantum coherent guiding rotation [Chin. Opt. Lett., Vol. 9, No. 2, 021405 (2011); Chinese Invention Patent No. ZL 201110071387.6; ZL 200910273490.1] have developed and demonstrated. These novel atomic filter methods and devices show a ~MHz-level filter passband and can more effectively restrain backlight noise and amplify signal lights or photon signals. However, with the increasing progress of science and technology, it is still very necessary to further develop novel and practical light-filtering methods and apparatuses based on atomic ultra-narrow line width.

BRIEF SUMMARY OF THE INVENTION

In order to solve the problem that the traditional Faraday anomalous dispersion optical filtering based on atomic ultra-narrow line width still cannot completely eliminate backlight under certain extreme conditions when used for the extraction and measurement of a weak signal light in a free space and to a light-filtering apparatus simpler in connection and more integrated, the present invention provides an optical-fiber atomic light-filtering apparatus which has a high backlight noise rejection rate, allows a polarized signal light to pass through at a low attenuation rate and eliminates backlight noise to realize light filtering by adopting novel polarizing fibers, which have the characteristic of high extinction ratio and only allow light in one polarized state to pass through to rapidly eliminate light in other polarized states under the effect of the high extinction ratio as well as by applying capillary atomic cells having magnetic fields with proper intensities and constant-temperature environments.

The present invention provides an optical-fiber atomic light-filtering apparatus comprising an optical-fiber coupling focusing collimating mirror, a first polarizing optical fiber, a first permanent magnetic ring, a pure iron frame shaped like the Chinese character "日", a heat preservation box, a first capillary atomic cell, an armored twisted-pair heating wire, a second permanent magnetic ring, a second polarizing optical fiber, a thermostat, a cable, a third permanent magnetic ring, a temperature sensor, a second capillary atomic cell, a fourth permanent magnetic ring, a third polarizing optical fiber and a photoelectric detector. The two pairs of permanent magnetic rings are matched with the pure iron frame shaped like the Chinese character "日" to provide magnetic fields for the two capillary atomic cells working in the same temperature environment; a polarizing plane changes after interaction between a weak signal light and atoms; and meanwhile, the weak light signal is polarized at a low attenuation rate and backlight noise is eliminated at a high extinction ratio by means of the three polarizing optical fibers. The apparatus is simple in structure, easy to operate, integrated and miniaturized, and is applicable to the extraction and measurement of the weak signal light in a free space.

To fulfill the objective of the present invention, the present invention provides the following technical measures:

An optical-fiber atomic light-filtering apparatus comprises an optical-fiber coupling focusing collimating mirror and a pure iron frame shaped like the Chinese character "日". The pure iron frame shaped like the Chinese character "日" comprises a closed pure iron outer frame and a holed pure iron partition plate arranged in the middle of the pure iron outer frame. The holed pure iron partition plate is provided with through holes. The pure iron frame shaped like the Chinese character "日" is partitioned by the holed pure iron partition plate into an upper cavity and a lower cavity. A heat preservation box arranged in the pure iron outer frame is partitioned by the holed pure iron partition plate into an upper heat preservation box body and a lower heat preservation box body, wherein the upper heat preservation box body is arranged in the upper cavity, the lower heat preservation box body is arranged in the lower cavity, and the upper heat preservation box body is communicated with the lower heat preservation box body via the through holes on the holed pure iron partition plate. A first capillary atomic cell is arranged in the upper heat preservation box body. A second capillary atomic cell is arranged in the lower heat preservation box body. A first armored twisted-pair heating wire is arranged outside the first capillary atomic cell. A second armored twisted-pair heating wire is arranged outside the second capillary atomic cell. The first armored twisted-pair heating wire and the second armored twisted-pair heating wire are connected in series to form an armored twisted-pair heating wire. The armored twisted-pair heating wire is connected with a thermostat through a cable. The thermostat is connected with a temperature sensor arranged in the heat preservation box. A first permanent magnetic ring and a second permanent magnetic ring are arranged in the upper cavity and respectively located at two ends of the first capillary atomic cell. A third permanent magnetic ring and a fourth permanent magnetic ring are arranged in the lower cavity and respectively located at two ends of the second capillary atomic cell.

One end of a first polarizing optical fiber is connected with the optical-fiber coupling focusing collimating mirror, and the other end of the first polarizing optical fiber sequentially penetrates through the pure iron frame shaped like the Chinese character "日", an inner hole of the first permanent magnetic ring and the upper heat preservation box body to be connected with one end of the first capillary atomic cell. One end of a second polarizing optical fiber sequentially penetrates through the pure iron frame shaped like the Chinese character "日", an inner hole of the second permanent magnetic ring and the upper heat preservation box body to be connected with the other end of the first capillary atomic cell, and the other end of the second polarizing optical fiber sequentially penetrates through the pure iron frame shaped like the Chinese character "日", an inner hole of the third permanent magnetic ring and the lower heat preservation box body to be connected with one end of the second capillary atomic cell. One end of the third polarizing optical fiber sequentially penetrates through the pure iron frame shaped like the Chinese character "日", the fourth permanent magnetic ring and the lower heat preservation box body to be connected with the other end of the second capillary atomic cell, and the other end of the third polarizing optical fiber is connected with a photoelectric detector.

Atoms in the first and second capillary atomic cells mentioned above include mercury atoms, calcium atoms, strontium atoms, potassium atoms, sodium atoms, rubidium atoms and cesium atoms.

The operating process of the optical-fiber atomic light-filtering apparatus is as follows: The two pairs of permanent magnetic rings are used in cooperation with the pure iron frame shaped like the Chinese character "日" to generate two operating magnetic fields, which have identical magnetic field intensities and magnetic field uniform areas, for the two capillary atomic cells respectively. The thermostat is used in combination with the armored twisted-pair heating wire, the temperature sensor and the heat preservation box to provide preset operating temperatures for the two capillary atomic cells. When the optical-fiber coupling focusing collimating mirror receives a weak signal light and backlight noise, the weak signal light and the backlight noise are sequentially transmitted through the first polarizing optical fiber, the first capillary atomic cell, the second polarizing optical fiber, the second capillary atomic cell and the third polarizing optical fiber. In the transmission process, under the polarizing effect of the polarizing optical fibers and the magneto-optical effect in the capillary atomic cells, the backlight noise is completely rejected, and the weak signal light is received by the photoelectric detector at a low loss. Thus, the optical-fiber atomic light-filtering apparatus realizes optical-fiber atomic light filtering at a high rejection ratio.

Compared with the prior art, the optical-fiber atomic light-filtering apparatus has the advantages that the light is filtered at a high rejection ratio by means of the polarizing characteristic of the polarizing optical fibers and the magneto-optical effect in the capillary atomic cells, and that large-angle optical rotation of the weak signal light is achieved by the capillary atomic cells without a high operating temperature or a strong magnetic field environment. Thus, the optical-fiber atomic light-filtering apparatus can be better integrated (self-integrated or integrated with other apparatuses) and miniaturized, can be conveniently expanded into a multi-stage light-filtering apparatus, and has practicability and important potential application value in the fields of quantum information processing, laser communication, laser radar and telemetering of remote light signals in free spaces.

Reference numbers used in the figures are as follows:
L1—backlight; L2—weak signal light; 1—optical-fiber coupling focusing collimating mirror; 2—first polarizing optical fiber; 3—first permanent magnetic ring; 4—pure iron frame shaped like the Chinese character "日"; 5—heat preservation box; 6—first capillary atomic cell; 7—armored twisted-pair heating wire; 8—second permanent magnetic ring; 9—second polarizing optical fiber; 10—thermostat; 11—cable; 12—third permanent magnetic ring; 13—temperature sensor; 14—second capillary atomic cell; 15—fourth permanent magnetic ring; 16—third polarizing optical fiber; 17—photoelectric detector.

DETAILED DESCRIPTION OF THE INVENTION AND EMBODIMENTS

The present invention is further described in detail as follows in combination with FIG. 1 (schematic diagram) and FIG. 2 (implementation diagram), but the present invention is by no means limited to the following embodiments.

Embodiment 1

With alkali metallic rubidium atoms as an example, a signal light is a laser light which has a wavelength of 780 nm and is matched with the D2 line of the rubidium atoms.

Figure 1:
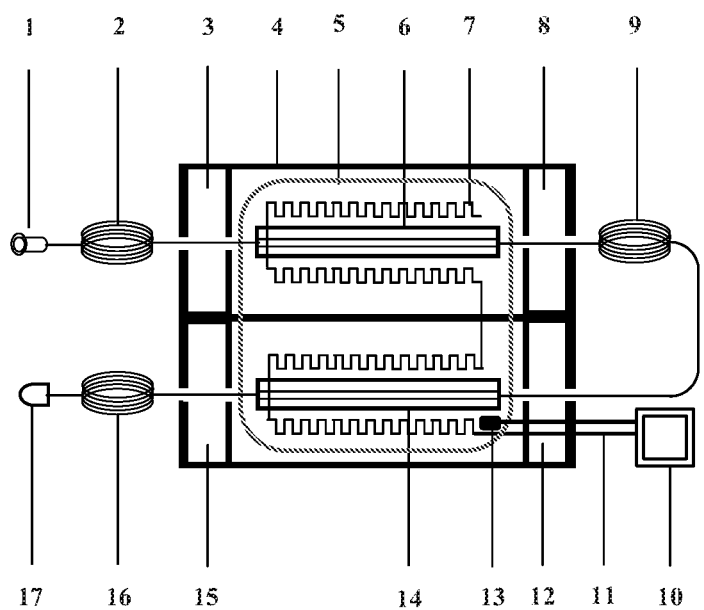
FIG. 1 is a schematic diagram showing an optical filtering apparatus of the present invention.
Figure 2:
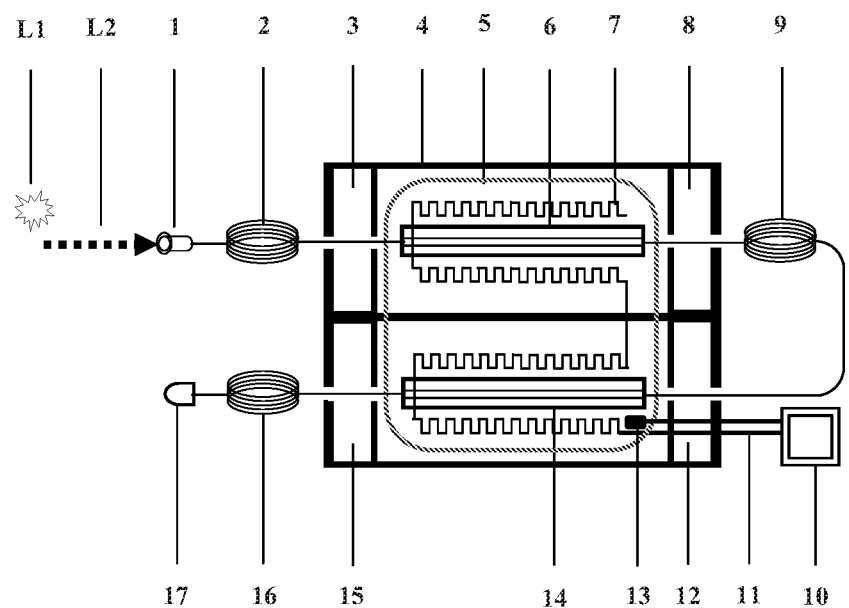
FIG. 2 is an implementation diagram showing the present invention.

As shown in FIG. 1, an optical-fiber atomic light-filtering apparatus comprises an optical-fiber coupling focusing collimating mirror 1, a first polarizing optical fiber 2, a first permanent magnetic ring 3, a pure iron frame shaped like the Chinese character "日" 4, a heat preservation box 5, a first capillary atomic cell 6, an armored twisted-pair heating wire 7, a second permanent magnetic ring 8, a second polarizing optical fiber 9, a thermostat 10, a cable 11, a third permanent magnetic ring 12, a temperature sensor 13, a second capillary atomic cell 14, a fourth permanent magnetic ring 15, a third polarizing optical fiber 16 and a photoelectric detector 17.

The pure iron frame shaped like the Chinese character "日" 4 comprises a closed pure iron outer frame and a holed pure iron partition plate arranged in the middle of the pure iron outer frame. Two rows of uniformly-distributed through holes are designed on the surface of the holed pure iron partition plate. The pure iron frame shaped like the Chinese character "日" 4 is partitioned by the holed pure iron partition plate into an upper cavity and a lower cavity. The heat preservation box 5 arranged in the pure iron outer frame is partitioned by the holed pure iron partition plate into an upper heat preservation box body and a lower heat preservation box body, wherein the upper heat preservation box body is arranged in the upper cavity, the lower heat preservation box body is arranged in the lower cavity, and the upper heat preservation box body is communicated with the lower heat preservation box body via the through holes on the holed pure iron partition plate. The first capillary atomic cell 6 is arranged in the upper cavity. The second capillary atomic cell 14 is arranged in the lower cavity. A first armored twisted-pair heating wire is arranged outside the first capillary atomic cell 6. A second armored twisted-pair heating wire is arranged outside the second capillary atomic cell 14. The first armored twisted-pair heating wire and the second armored twisted-pair heating wire are connected in series to form the armored twisted-pair heating wire 7. The armored twisted-pair heating wire 7 is connected with the thermostat 10 through the cable 11. The thermostat 10 is connected with the temperature sensor 13 arranged in the heat preservation box 5. The first permanent magnetic ring 3 and the second permanent magnetic ring 8 are arranged in the upper cavity of the pure iron frame shaped like the Chinese character "日" 4 and respectively located at two ends of the first capillary atomic cell 6. The third permanent magnetic ring 12 and the fourth permanent magnetic ring 15 are arranged in the lower cavity of the pure iron frame shaped like the Chinese character "日" 4 and respectively located at two ends of the second capillary atomic cell 14.

One end of the first polarizing optical fiber 2 is connected with the optical-fiber coupling focusing collimating mirror 1, and the other end of the first polarizing optical fiber 2 sequentially penetrates through the pure iron frame shaped like the Chinese character "日" 4, an inner hole of the first permanent magnetic ring 3 and the upper heat preservation box body to be connected with one end of the first capillary atomic cell 6. One end of the second polarizing optical fiber 9 sequentially penetrates through the pure iron frame shaped like the Chinese character "日" 4, an inner hole of the second permanent magnetic ring 8 and the upper heat preservation box body to be connected with the other end of the first capillary atomic cell 6, and the other end of the second polarizing optical fiber 9 sequentially penetrates through the pure iron frame shaped like the Chinese character "日" 4, an inner hole of the third permanent magnetic ring 12 and the lower heat preservation box body to be connected with one end of the second capillary atomic cell 14. One end of the third polarizing optical fiber 16 sequentially penetrates through the pure iron frame shaped like the Chinese character "日" 4, the fourth permanent magnetic ring 15 and the lower heat preservation box body to be connected with the other end of the second capillary atomic cell 14, and the other end of the third polarizing optical fiber 16 is connected with the photoelectric detector 17. The thermostat 10 is connected with the armored twisted-pair heating wire 7 and the temperature sensor 13 through the cable 11 and automatically controls the operating temperature in the heat preservation box 5. The first permanent magnetic ring 3 and the second permanent magnetic ring 8 are matched with the pure iron frame shaped like the Chinese character "日" 4 to provide an operating magnetic field for the first capillary atomic cell 6. The third permanent magnetic ring 12 and the fourth permanent magnetic ring 15 are matched with the pure iron frame shaped like the Chinese character "日" 4 to provide an operating magnetic field for the second capillary atomic cell 14.

The holed pure iron partition plate is arranged in the middle of the pure iron outer frame, constitutes a middle portion of the pure iron frame shaped like the Chinese character "日" 4 and partitions the magnetic fields into two areas. The pure iron frame shaped like the Chinese character "日" 4 is used in combination with the first permanent magnetic ring 3 and the second permanent magnetic ring 8 to form one magnetic field area, the pure iron frame shaped like the Chinese character "日" 4 is used in combination with the third permanent magnetic ring 12 and the fourth permanent magnetic ring to form the other magnetic field area, magnetic field intensities of the two magnetic field areas are equal in work, and the through holes uniformly distributed on the surface of the holed pure iron partition plate in the middle of the pure iron frame shaped like the Chinese character "日" 4 have no influence on the magnetic fields.

The heat preservation box 5 comprises the upper heat preservation box body and the lower heat preservation box body. The first armored twisted-pair heating wire and the first capillary atomic cell 6 are arranged in the upper heat preservation box body. The second armored twisted-pair heating wire and the second capillary atomic cell 14 are arranged in the lower heat preservation box body. The upper heat preservation box body is communicated with the lower heat preservation box body via the through holes on the holed pure iron partition plate. In order to keep the temperature in the upper heat preservation box body and the temperature in the lower heat preservation box body consistent, the first armored twisted-pair heating wire and the second armored twisted-pair heating wire are respectively arranged in the upper heat preservation box body and the lower heat preservation box body in an equal-length manner. Total ten through holes uniformly distributed in two rows are designed on the holed pure iron partition plate in the middle of the pure iron frame shaped like the Chinese character "日" 4 (typically, the through holes have a diameter of 5 mm).

The wavelength range of an antireflection film of the optical-fiber coupling focusing collimating mirror 1 is associated with the operating wavelength of the alkali metallic rubidium atoms in the first capillary atomic cell 6 and the second capillary atomic cell 14. For instance, if the alkali metallic rubidium atoms in the first capillary atomic cell 6 and the second capillary atomic cell 14 operate on the D2 spectral line, the wavelength range of the antireflection film of the optical-fiber coupling focusing collimating mirror 1 is 780 nm.

Embodiment 2

In one specific application (such as communication), the type and quantity of atoms in the first capillary atomic cell 6 are identical with those of atoms in the second capillary atomic cell 14, such as alkali metallic rubidium atoms.

The first permanent magnetic ring 3 and the second permanent magnetic ring 8 are used in cooperation with the pure iron frame shaped like the Chinese character "日" 4 to generate an operating magnetic field for the first capillary atomic cell 6.

The third permanent magnetic ring 12 and the fourth permanent magnetic ring 15 are used in cooperation with the pure iron frame shaped like the Chinese character "日" 4 to generate an operating magnetic field for the second capillary atomic cell 14.

In one specific application (such as communication), the two generated operating magnetic fields have identical magnetic field intensities such as 0.0150 T and identical uniform magnetic field areas, and the intensities of the operating magnetic fields depend on lengths of the first capillary atomic cell 6 and the second capillary atomic cell 14.

The thermostat 10 is used in combination with the armored twisted-pair heating wire 7, the temperature sensor 13 and the heat preservation box 5 to provide constant operating temperatures for the first capillary atomic cell 6 and the second capillary atomic cell 14. The operating temperatures depend on the density of the atoms. As the first capillary atomic cell 6 and the second capillary atomic cell 14 are located on the same heat preservation box 5, the temperatures sensed by the capillary atomic cell 6 and the second capillary atomic cell 14 are identical. However, different atoms have the requirement for different operating temperatures.

When a 780 nm weak signal light L2 matched with the D2 line of the alkali metallic rubidium atoms enters the optical-fiber atomic light-filtering apparatus along with sunlight or lamp backlight L1, the weak signal light L2 is received by the optical-fiber coupling focusing collimating mirror 1 coated with an antireflection film within a wavelength range of 780 nm, and afterwards, the weak signal light L2 is sequentially transmitted through the first polarizing optical fiber 2 with an operating wavelength of 780 nm, the first capillary atomic cell 6 operating in a 0.0150 T magnetic field and a 365 K constant-temperature environment and filled with the alkali metallic rubidium atoms, and the second polarizing optical fiber 9 with an operating wavelength of 780 nm; based on the interaction between rubidium atomic vapor in the first capillary atomic cell 6 and the 780 nm weak signal light L2, the polarizing plane of the weak signal light L2 is rotated by a certain angle under the magneto-optical effect, and through the polarizing effect of the first polarizing optical fiber 2 and the second polarizing optical fiber 9 with a bare-fiber extinction ratio of 60 db, most backlight L1 is filtered out, and the weak signal light L2 can continue to be transmitted.

Then, the weak signal light L2 sequentially passes through the second capillary atomic cell 14 operating in a magnetic field and a constant-temperature environment and filled with the alkali metallic rubidium atoms and the third polarizing optical fiber 16 with an operating wavelength of 780 nm, and thus, the backlight L1 is restrained.

Finally, the photoelectric detector 17 with an operating wavelength of 780 nm receives the weak signal light L2 transmitted at a low loss. The apparatus of the present invention realizes optical-fiber atomic light filtering at a high rejection ratio.

Wherein:

The backlight L1 plays a role of light noise and has an influence on the effective detection and measurement of the signal light. For instance, the backlight L1 is sunlight, moonlight, starlight, lamplight or other radiant light.

The weak signal light L2 is a laser light (communication), a fluorescent light (atmospheric sounding), or photons (quantum information processing and communication), carrying with information. As one example of this embodiment of the present invention, a 780 nm laser light which is emitted by a Toptic DL-100 Pro laser device and matched with the D2 spectral line of the alkali metallic rubidium atoms is typically used.

The optical-fiber coupling focusing collimating mirror is non-magnetic and is a convex arched transmission-type mirror with the spherical surface inclined by 8°. According to the wavelength design of the signal light, the optical-fiber coupling focusing collimating mirror is coated with an antireflection film within a wavelength range of 780 nm and is used for collecting an incident light and guiding, collimating and transmitting the incident light into the first polarizing optical fiber.

The first polarizing optical fiber is also called optical fiber polarizer. An IXBlueIXS-POL-780-125 polarizing optical fiber of a Tiger design structure is typically used. The extinction ratio of the polarizing optical fiber can be adjusted by controlling the reel diameter of the polarizing optical fiber, and typically, the bare-fiber extinction ratio of the first polarizing optical fiber is greater than 60 db. The first polarizing optical fiber can realize low attenuation and good temperature stability.

The first permanent magnetic ring is customized and made from neodymium-iron-boron (NdFeB), is typically of the model N35SH and has an operating temperature of 420 K, a typical outer diameter of 30 mm, a bore diameter of 5 mm and a thickness of 5 mm. The first permanent magnetic ring is used in cooperation with the second permanent magnetic ring and in combination with the pure iron frame shaped like the Chinese character "日" to provide an operating magnetic field for the atoms in the first capillary atomic cell.

The pure iron frame shaped like the Chinese character "日" is self-made from DT4C electrical pure ion and is used in combination with the first permanent magnetic ring, the second permanent magnetic ring, the third permanent magnetic ring and the fourth permanent magnetic ring to respectively generate two magnetic field areas to provide magnetic field environments for operation of the atoms in the first capillary atomic cell and the second capillary atomic cell. According to the lengths of the first capillary atomic cell and the second capillary atomic cell, the pure iron frame shaped like the Chinese character "日" can generate the magnetic fields with intensities ranging from 0.0150 T to 0.2000 T.

The heat preservation box is self-made, used for heat preservation of the first capillary atomic cell and the second capillary atomic cell and typically made from polyimide foam boards with a thickness of 5-20 mm and has a long-time operating temperature of 570 K. The heat preservation box has the characteristics of being easy to machine, low in weight and the like.

The first capillary atomic cell is self-made, sealed with two window pieces with parallel end faces based on the optical cement technique and made from pyrex glass and has a capillary inner diameter ranging from 0.5 mm to 2.0 mm. According to the application requirement of the light-filtering apparatus, the first capillary atomic cell is filled with atom samples and is used for interacting with the incident polarized signal light to achieve light filtering.

The armored twisted-pair heating wire is customized and used for providing an electric heating power and has an operating current ranging from 0.5 A to 3 A. The armored twisted-pair heating wire is used in cooperation with a temperature controller and the temperature sensor to heat the first capillary atomic cell and the second capillary atomic cell and to keep the temperature in the first capillary atomic cell and the temperature in the second capillary atomic cell constant.

The second permanent magnetic ring is identical with the first permanent magnetic ring in material, model and size and is used in cooperation with the first permanent magnetic ring and in combination with the pure iron frame shaped like the Chinese character "日" to provide an operating magnetic field for the atoms in the first capillary atomic cell.

The second polarizing optical fiber is identical with the first polarizing optical fiber in material, model and reel diameter and is used for polarizing the signal light transmitted through the first capillary atomic cell to further filter out residual backlight.

The thermostat is used for providing an electric power for the armored twisted-pair heating wire and keeping the temperature in the first capillary atomic cell and the temperature in the second capillary atomic cell constant. An OMRON E5CZ digital temperature controller with an operating temperature ranging from 375 k to 480 K is typically used.

The cable is used as a channel for the thermostat to provide an electric power for controlling the armored twisted-pair heating wire and is connected with the temperature sensor.

The third permanent magnetic ring is identical with the first permanent magnetic ring and the second permanent magnetic ring in material, model and size and is used in cooperation with the fourth permanent magnetic ring and in combination with the pure iron frame shaped like the Chinese character "日" to provide an operating magnetic field for the atoms in the second capillary atomic cell.

The temperature sensor is typically a platinum resistor PT100 and is matched with the temperature controller and used for measuring the temperature in the heat preservation box in real time.

The second capillary atomic cell is identical with the first capillary atomic cell in material and size, is filled with atom samples identical with the atom samples in the first capillary atomic cell and is used for further interacting with the signal light transmitted through the second polarizing optical fiber to realize light filtering.

The fourth permanent magnetic ring is identical with the first, second and third permanent magnetic rings in material, model and size and is used in cooperation with the third permanent magnetic ring and in combination with the pure iron frame shaped like the Chinese character "日" to provide an operating magnetic field for the atoms in the second capillary atomic cell.

The third polarizing optical fiber is identical with the first polarizing optical fiber and the second polarizing optical fiber in material, model and reel diameter and is used for polarizing the signal light transmitted through the second capillary atomic cell to further filter out residual backlight noise.

The photoelectric detector is used for receiving the filtered signal light emitted from the second capillary atomic cell, then photoelectrically converting the light signal into an electric signal and finally outputting the electric signal. For weak photon signals, an Excelitas SPCM-AQRH single-photon counter which can detect signal photons within a wavelength range of 400-1060 nm is typically used.

Embodiment 2 is identical with embodiment 1 on other aspects.

The specific embodiments in the specification are only used for illustrating the spirit of the present invention. Without deviating from the spirit of the present invention or beyond the scope defined by the claims, various modifications, supplementations or similar substitutes of these specific embodiments can be made by those skilled in the field.

We claim:
1. An optical-fiber atomic light-filtering apparatus, comprising
an optical-fiber coupling focusing collimating mirror,
a pure iron frame shaped like a Chinese character "日" the pure iron frame shaped like the Chinese character "日" further comprising a closed pure iron outer frame and a holed pure iron partition plate arranged in a middle of the pure iron outer frame, wherein the holed pure iron partition plate is provided with through holes, and the pure iron frame shaped like the Chinese character "日" is partitioned by the holed pure iron partition plate into an upper cavity and a lower cavity,
a heat preservation box being arranged in the pure iron outer frame, wherein the heat preservation box is partitioned by the holed pure iron partition plate into an upper heat preservation box body and a lower heat preservation box body, the upper heat preservation box body is arranged in the upper cavity, the lower heat preservation box body is arranged in the lower cavity, and the upper heat preservation box body is communicated with the lower heat preservation box body via the through holes on the holed pure iron partition plate,
a first capillary atomic cell, the first capillary atomic cell being arranged in the upper heat preservation box body and having a first end and a second end,
a second capillary atomic cell, the second capillary atomic cell being arranged in the lower heat preservation box body and having a first end and a second end,
a first armored twisted-pair heating wire being arranged outside the first capillary atomic cell,
a second armored twisted-pair heating wire being arranged outside the second capillary atomic cell, wherein the first armored twisted-pair heating wire is connected with the second armored twisted-pair heating wire,
an armored twisted-pair heating wire formed by the connection of the first armored twisted-pair heating wire and the second armored twisted-pair heating wire,
a thermostat being connected with the armored twisted-pair heating wire through a cable,
a temperature sensor being connected with the thermostat and being arranged in the heat preservation box,
a first permanent magnetic ring and a second permanent magnetic ring, wherein the first permanent magnetic ring and the second permanent magnetic ring are arranged in the upper cavity and respectively located at two ends of the first capillary atomic cell,
a third permanent magnetic ring and a fourth permanent magnetic ring, wherein the third permanent magnetic ring and the fourth permanent magnetic ring are arranged in the lower cavity and respectively located at two ends of the second capillary atomic cell,
a first polarizing optical fiber having a first end and a second end, wherein the first end of the first polarizing optical fiber is connected with the optical-fiber coupling focusing collimating mirror, and the second end of the first polarizing optical fiber sequentially penetrate through the pure iron frame shaped like the Chinese character "日," an inner hole of the first permanent magnetic ring, and the upper heat preservation box body to be connected with the first end of the first capillary atomic cell, a second polarizing optical fiber having a first end and a second end, wherein the first end of the second polarizing optical fiber sequentially penetrate through the pure iron frame shaped like the Chinese character "日," an inner hole of the second permanent magnetic ring, and the upper heat preservation box body to be connected with the second end of the first capillary atomic cell, and the second end of the second polarizing optical fiber sequentially penetrates through the pure iron frame shaped like the Chinese character "日," an inner hole of the third permanent magnetic ring, and the lower heat preservation box body to be connected to the first end of the second capillary atomic cell, and a third polarizing optical fiber having a first end and a second end, wherein the first end of the third polarizing optical fiber sequentially penetrates through the pure iron frame shaped like the Chinese character "日," the fourth permanent magnetic ring, and the lower heat preservation box body to be connected with the second end of the second capillary atomic cell, and a photoelectric detector, the photoelectric detector being connected to the second end of the third polarizing optical fiber.

2. The optical-fiber atomic light-filtering apparatus according to claim 1, wherein atoms in the first capillary atomic cell and the second capillary atomic cell comprise mercury atoms, calcium atoms, strontium atoms, potassium atoms, sodium atoms, rubidium atoms, cesium atoms, or a combination thereof.

* * * * *